United States Patent
Zimelman

[11] Patent Number: 5,662,379
[45] Date of Patent: Sep. 2, 1997

[54] SHIELDED CHILD SEAT AND METHOD

[76] Inventor: Eric Mark Zimelman, 6920 SW. 44th St., No. 210, Miami, Fla. 33155

[21] Appl. No.: 585,146

[22] Filed: Jan. 11, 1996

[51] Int. Cl.$^6$ .................................................. A47C 1/08
[52] U.S. Cl. .............................. 297/256.15; 297/216.11; 297/487
[58] Field of Search ..................... 297/487, 216.11, 297/216.1, 256.15, 250.1, 184.1, 184.11, 184.13, 184.14, 184.12, 184.15, 184.17, 220, 221, 219.12; 135/903, 124

[56] References Cited

U.S. PATENT DOCUMENTS

| | | | |
|---|---|---|---|
| 73,313 | 1/1868 | Estes | 297/184.15 |
| 3,713,695 | 1/1973 | Von Wimmersperg | 297/487 X |
| 3,773,380 | 11/1973 | Stockdill | |
| 3,848,921 | 11/1974 | Rhodes | 297/184.12 X |
| 4,027,915 | 6/1977 | Anderson et al. | 297/184.13 |
| 4,813,739 | 3/1989 | Miller | 297/184.13 X |
| 5,230,523 | 7/1993 | Wilhelm | 297/250.1 X |

*Primary Examiner*—Milton Nelson, Jr.
*Attorney, Agent, or Firm*—Dominik & Stein

[57] ABSTRACT

Disclosed is a new and improved child seat for use with an automobile with airbags. A roll-top safety shield can be fully retracted for open access or can be locked into place to shield a child against injuries related to an inflating airbag. An object of the roll top safety shield is to shield the child against injuries caused by an inflating airbag and against debris that may be loosened and launched during an impact. The roll top shield is designed to allow the child to enjoy the view, yet also provide easy and quick removal for cleaning. The roll top safety shield may also be embodied in a kit form, where a supplemental shield assembly can be removably secured to an existing child seat.

33 Claims, 4 Drawing Sheets

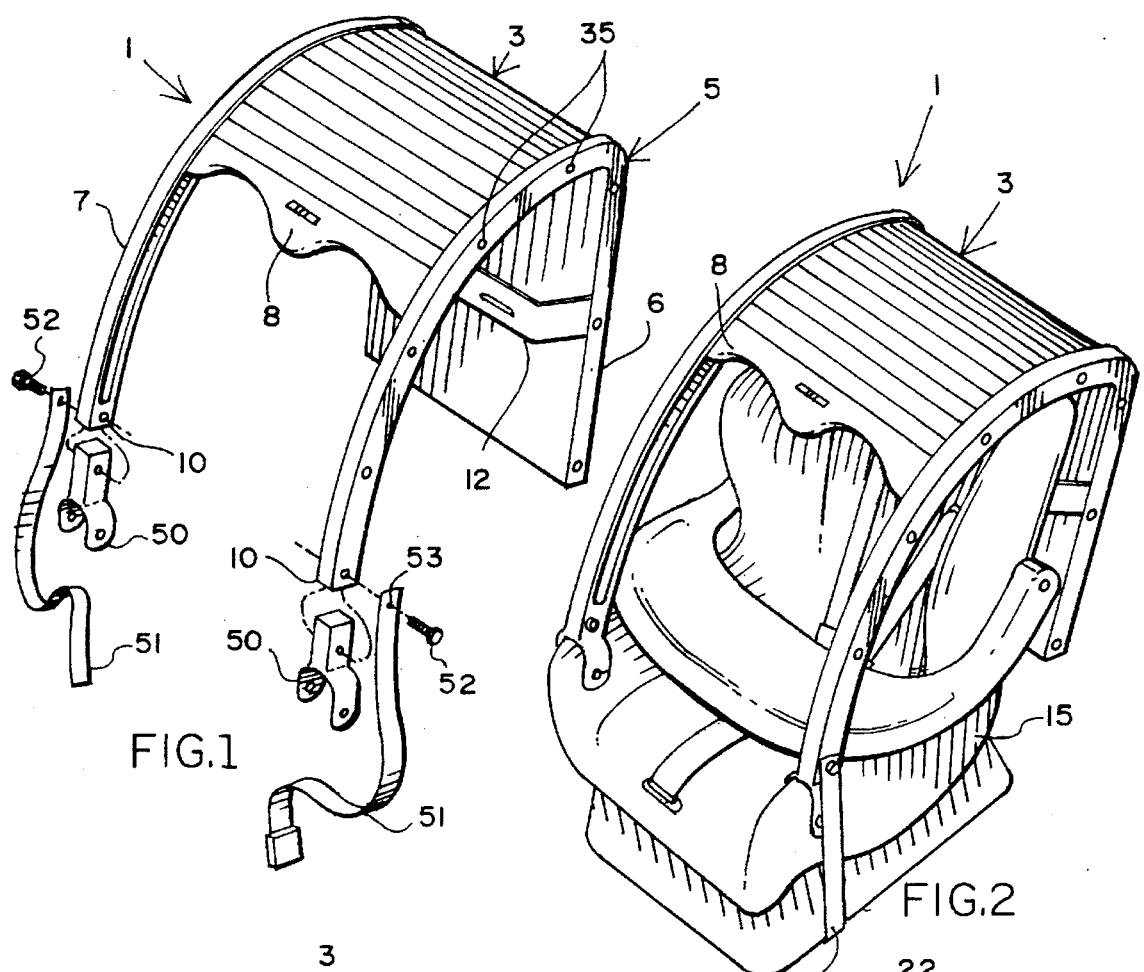
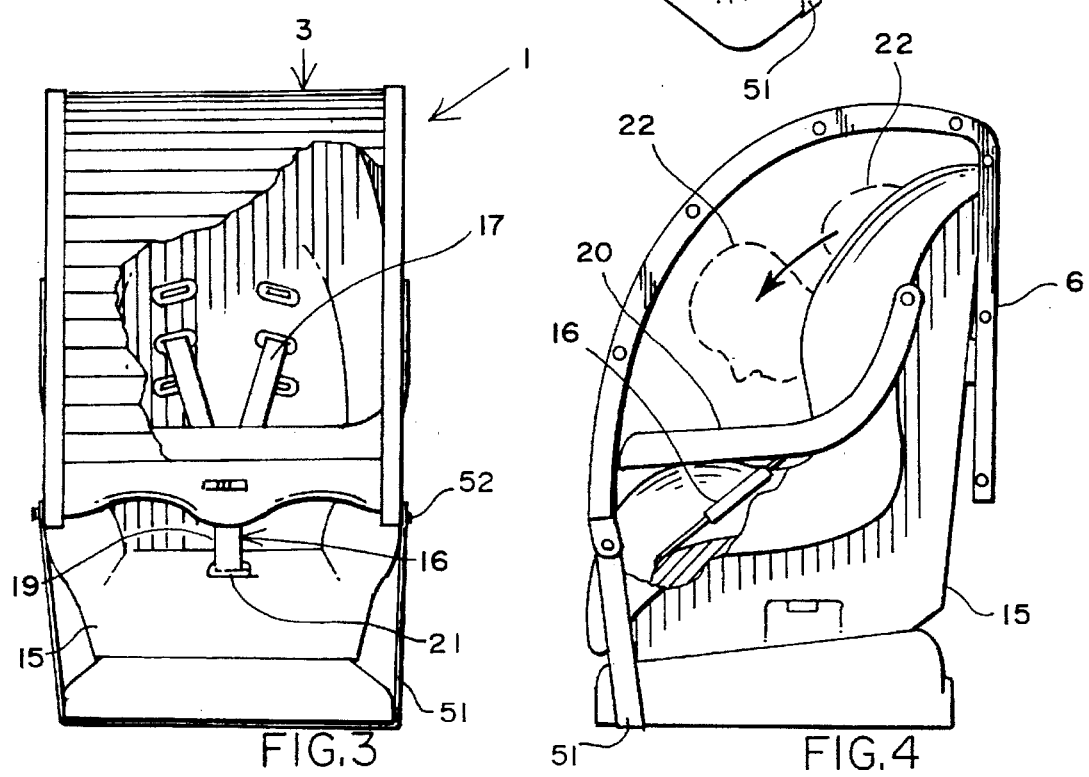

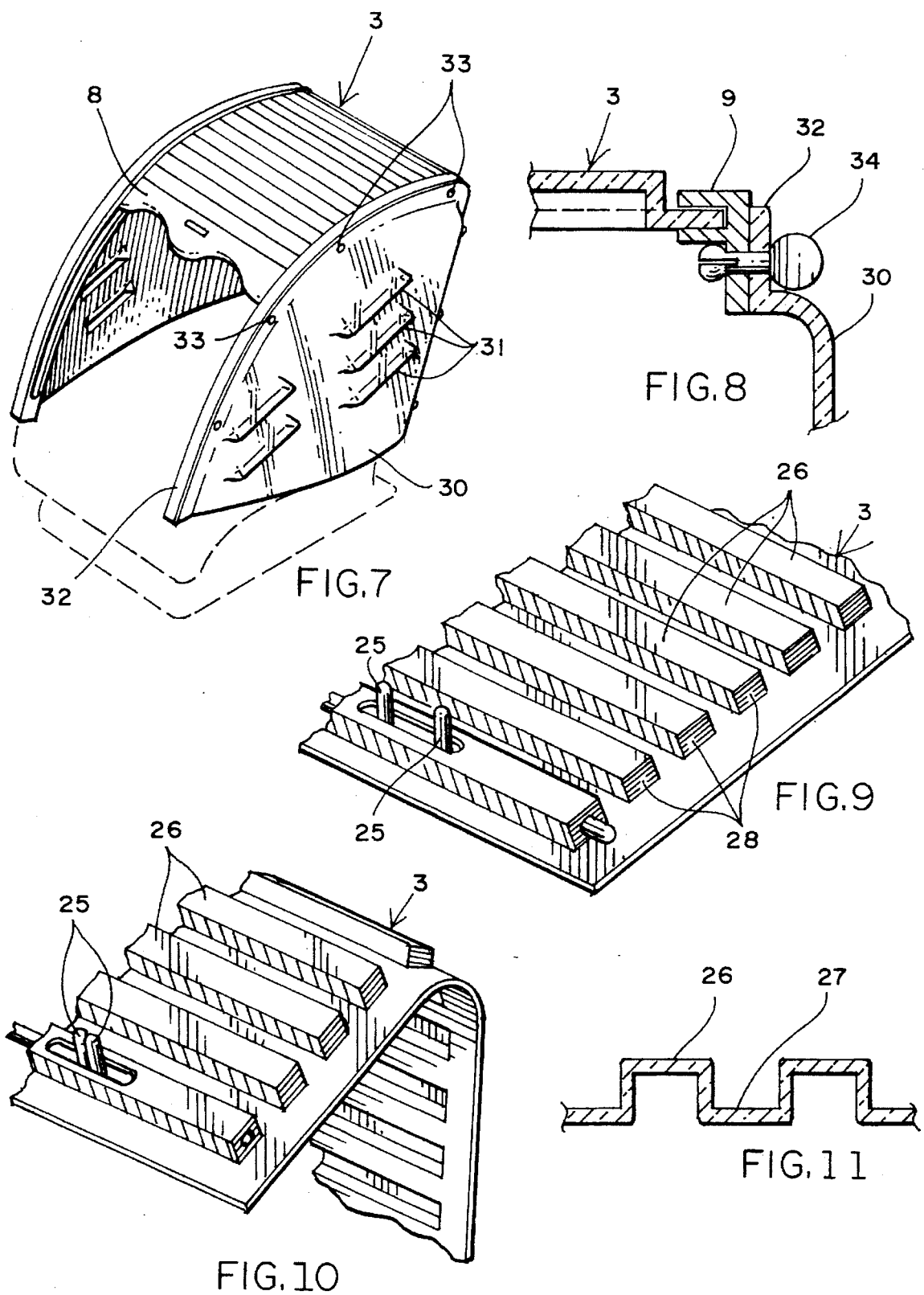

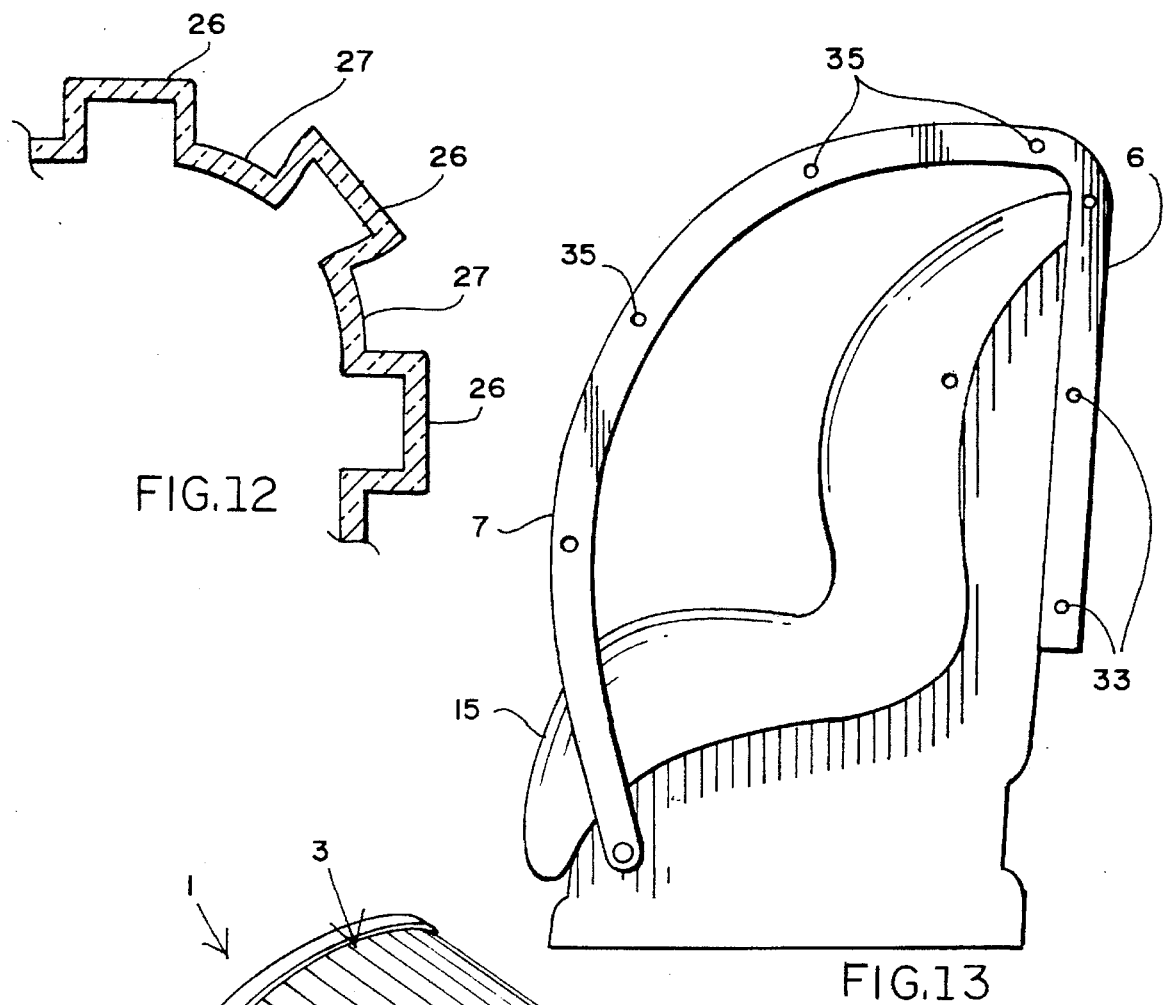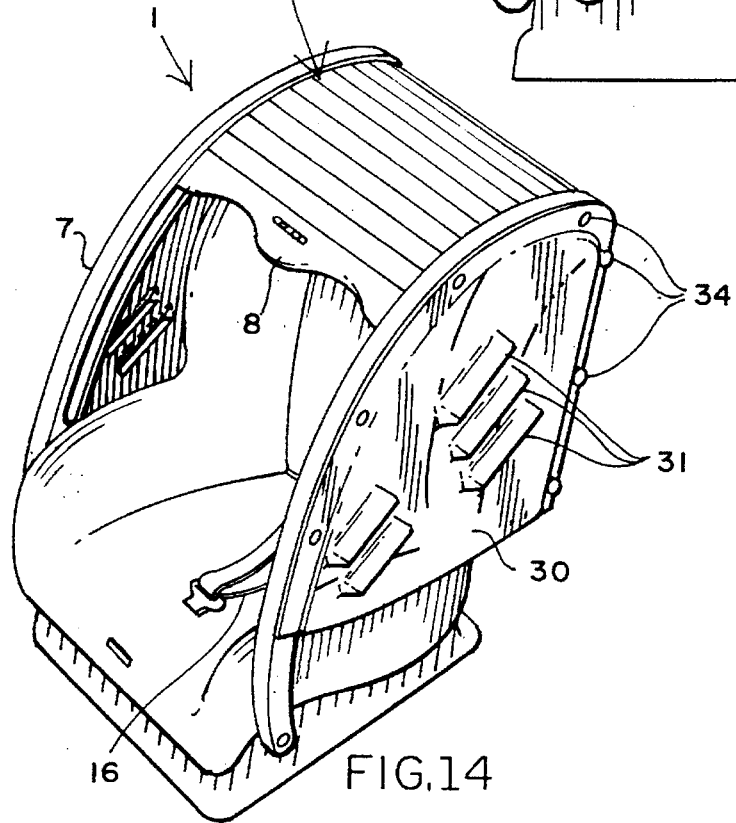

SHIELDED CHILD SEAT AND METHOD

FIELD OF THE INVENTION

The present invention is directed to a child's seat for use with a standard car seat. (Throughout this application, the car manufacturer's factory installed seat, for use by both adults and children, shall be referred to as a "car seat" to distinguish it from the separately purchased "child seat".) More particularly, the invention relates to a new and improved child seat for use in conventional automobiles with passenger airbags. One of the objects of the invention is to help protect the child seated in the shielded child seat from the intense pressure of an inflating airbag and also from flying debris that may result during a collision. This additional protection for the child can be embodied in an integrated shielded child seat, or alternatively, in a kit form to be added to an existing child seat.

BACKGROUND OF THE INVENTION

All fifty states and the District of Columbia require infants and toddlers to be securely fastened into car seats while riding in a moving automobile. An additional requirement is that infants under 20 pounds must ride in a rearward-facing child seat. As a result, many child seats are designed to allow rearward or forward orientation of the child. However, with the advent of the airbag that inflates upon impact, the traditional child seat poses significant hazards to the seated child. For example, if the child is placed in a rearward-facing child seat, an inflating airbag can quickly catapult the child seat and the occupant into the back supporting member of the car seat, which may pin the child between the car seat and the child seat, or worse, crush the baby's legs or arms.

Furthermore, placing the child in a forward-facing child seat does not protect the child from an inflating airbag. In this position, the child may be smothered by an airbag that presses against the child's face during inflation, or the child can be burned from the intense friction that results from the movement of the inflating airbag across the non-moving child. Another potential threat is caused by flying debris that often result from the inflation of the airbag. There are numerous cases of injuries to passengers, including children seated in child seats, that are the result of trim panels that separate from the dashboard as the air bag inflates. Such injuries are currently the subject of investigation by the Transportation Department's National Highway Traffic Safety Administration. *Danger of Dashboards, Air Bags Probed by the U.S.*, The Wall Street Journal, Jun. 19, 1995, at A7.

It is known that child seats can be equipped with sun visors and windshields, but this existing equipment does not attempt to protect the child from injuries associated with airbags. The prior art fails to adequately address airbag injuries. Perhaps this is due to the fact that airbags have only recently become widely available. Also, airbags are generally available only for the front seat driver and the front seat passenger, but in the near future, automobile manufacturers will be offering rear passenger airbags that are mounted in the backs of the front seats. The problems posed to children riding in child seats will then become even more prevalent. Some car manufacturers are considering installing switches to selectively activate and deactivate airbags. Using switches, however, is not the answer because they require human input, and a driver can easily forget to adjust the switch for each change in passengers.

One previous attempt to provide protection for children riding in child seats is disclosed in U.S. Pat. No. 5,083,837, issued to Roach. The patent to Roach discloses a "safety shield" that attaches to the upper portion of a car seat to protect the baby primarily from prolonged exposure to sunshine, but also to protect the child's head from impact during a collision. This shield offers protection only for the child's head. Moreover, because of its shape, there remains the possibility of injury by an air bag during a collision. For example, the air bag could pinch the baby's fingers along the edge of the shield, or could even pinch the baby along the baby's middle and lower body, each of which could pose serious injuries.

Another attempt to protect children with child seats is disclosed in U.S. Pat. No. 3,713,695 issued to Von Wimmersperg. The patent to Von Wimmersperg discloses a "safety seat" that incorporates a stretchable head-restraining member to absorb the momentum of the baby during a collision. The distinguishing features here are two fold: 1) the head-restraining member is designed to engage the baby's head during the impact and slowly absorb the momentum, which action would be interrupted by an inflating airbag; and 2) the head-restraining member offers no protection from an inflating air bag.

Still another child seat is disclosed in U.S. Pat. No. 4,195,879 issued to Miller. The patent to Miller discloses a protective seat for motorcycles and snowmobiles which is formed of a rigid body receiving structure with rigid side walls and with a hinge-mounted, transparent bubble type hood. Miller's rigid walls and hood are intended to provide the protection which is missing in most child seats because automobile seats rely upon the automobiles that carry them to provide protection against impacts. The rigid, hinged bubble hood used here is very different from the "roll-top" hood envisioned by applicant's invention. For example, a hinged hood would never work inside an automobile because there would be insufficient head room to allow for a complete opening of the hood.

Still another is disclosed in U.S. Pat. No. 4,314,727 issued to Potts. The patent to Potts discloses a "weather guard" for attachment to a child seat to protect the child against wind, rain, sun and irritants. While the design is not intended to protect against collisions, it undoubtedly provides some assistance. Still, like Roach above, the shield offers protection only for the child's head. Moreover, because of its shape, there remains the possibility of injury during the inflation of an air bag. For example, the air bag could pinch the baby's fingers along the edge of the shield, or could even pinch the baby along the baby's middle and lower body, each of which could pose serious injuries.

Yet another attempt is disclosed in U.S. Pat. No. 4,195,879 issued to Costa. The patent to Costa discloses a windshield assembly for a child seat which is to be used in a convertible top automobile. While the shield ostensibly provides frontal protection against wind, it also has the potential problems of pinching a baby's arms and fingers because its shape allows the baby arms and hands to reach around the shield. Additionally, the shape is such that a baby could hit his or her head against the shield during an impact. Finally, the shield must be removed (as opposed to being rolled towards the back) in order to remove the child.

The above devices fail to set forth a child seat that achieves the degree of effectiveness as the present invention in reducing injuries to the child as the result of an inflating airbag. The present invention meets these needs by enabling the child to enjoy the ride though a clear protective covering in a forward facing child seat, and yet allowing the supervising adult to quickly and easily place and remove the child in a protective seat.

SUMMARY OF THE INVENTION

The present invention is directed to a shielded child seat that shields the child in anticipation of an inflating airbag. The invention, in one form, is directed to a conventional-type child seat having side panels with parallel, opposed tracks to allow a roll top shield to be lowered over the top of the child. The shield is made of clear, semi-rigid material that is capable of flexing without breaking. The shield is well ventilated to allow air circulation within the enclosed, protected area. The shield can be raised and lowered into an "open position" or a "safety position", respectively. Once locked in its safety position, the shield helps protect the child against inflating airbags and also flying debris. The lock discourages the child from dislodging the roll top and defeating its protection. The shield can also be quickly raised along the tracks to its open position, wherein the shield is stored behind the child, yet internal of the shielded child seat. Once locked in its open position, the roll top shield provides open access for an adult to place a child in the child seat. The shield can also be removed from the child seat to allow ease of cleaning. This is especially important since infants and toddlers often soil surfaces within their reach. Optionally, protective side panels can be installed to shield the child against debris that may enter from the sides.

The present invention can also be embodied in a kit form, whereby a roll top shield assembly may be removably secured to a preexisting child seat to provide the child with additional protection. The kit form can also accommodate the optional side panels.

In view of the foregoing it is a principle object of the present invention to shield the child against injuries caused by an inflating airbag. Potential injuries can be caused by the airbag itself, which can smother the child, burn the child because of the rapid movement of the bag across the child's skin, or even pinch the child's arms and legs between the bag and the child seat. The present invention allows the adult to place the child in a forward facing or a rearward facing orientation, wherein the child seat provides protection against an inflating airbag and flying debris.

A related object of the present invention is to shield the child that is placed in a rearward-facing position against injuries caused by an inflating airbag that can press against the back of the child seat and pinch the child between the child seat and the car seat.

A related object of the present invention is to shield the child against injuries caused by the flying debris that result from a collision. For example, it is known that panel trim loosened by an inflating airbag can injure passengers. Also, there can be debris that is generated from the impact of a collision unrelated to the inflating airbag. The present invention can help shield the child from both types of debris.

Yet another object of the present invention is to help protect the child from head injuries during a collision by providing a contoured front shield that allows for the forward movement of a child's head during a collision.

Yet another object of the present invention is to allow the supervising adult to quickly and easily place the child in the child seat and within the protection of the safety shield. Because the safety shield quickly rolls in and out of place, convenience is achieved.

Yet another object of the present invention is to provide a safety shield that is stored within the child seat. The roll top shield can be quickly retracted and stored behind the child seat. From its retracted position, the roll top shield can be rolled down and locked in place to help provide protection for the child.

Yet another object of the present invention is to provide a safety shield that can be easily removed for cleaning. A safety shield that sits in front of a child tends to collect smudge prints as well as food that may be dropped by the child. The quick removal feature of the roll top shield allows it to be cleaned, perhaps with a hose, and then re-installed in the child seat.

DESCRIPTION OF THE ILLUSTRATIVE DRAWINGS

Further objects and advantages of the present invention will become apparent from the following description of an illustrative embodiment, taken in conjunction with the accompanying drawings, in which:

FIG. 1 is a perspective view of the kit form embodiment of the roll-top shield;

FIG. 2 is a perspective view of the roll-top shield once it is installed on a child seat;

FIG. 3 is a front view of the child seat and shield of FIG. 2;

FIG. 4 is a sideview of the child seat and a shield, together with an outline of a child's head in an extreme position as might occur during a collision. The outline indicates the protection against head injuries offered by the contoured front shield;

Figure 5:
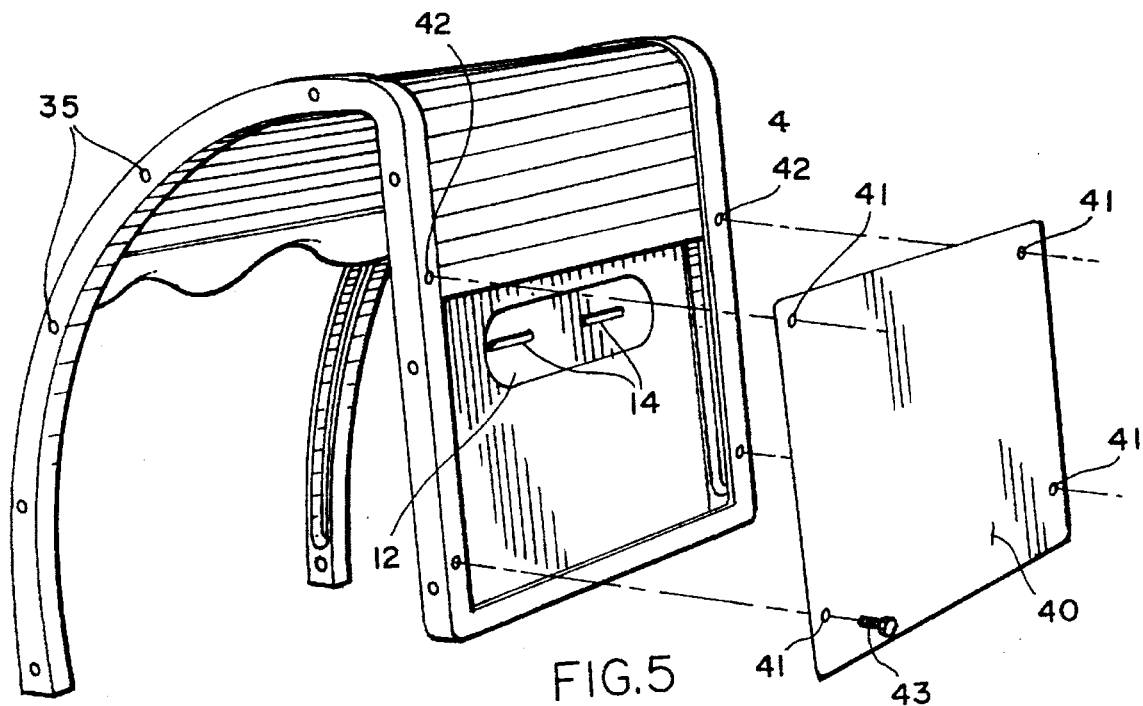
Figure 6:
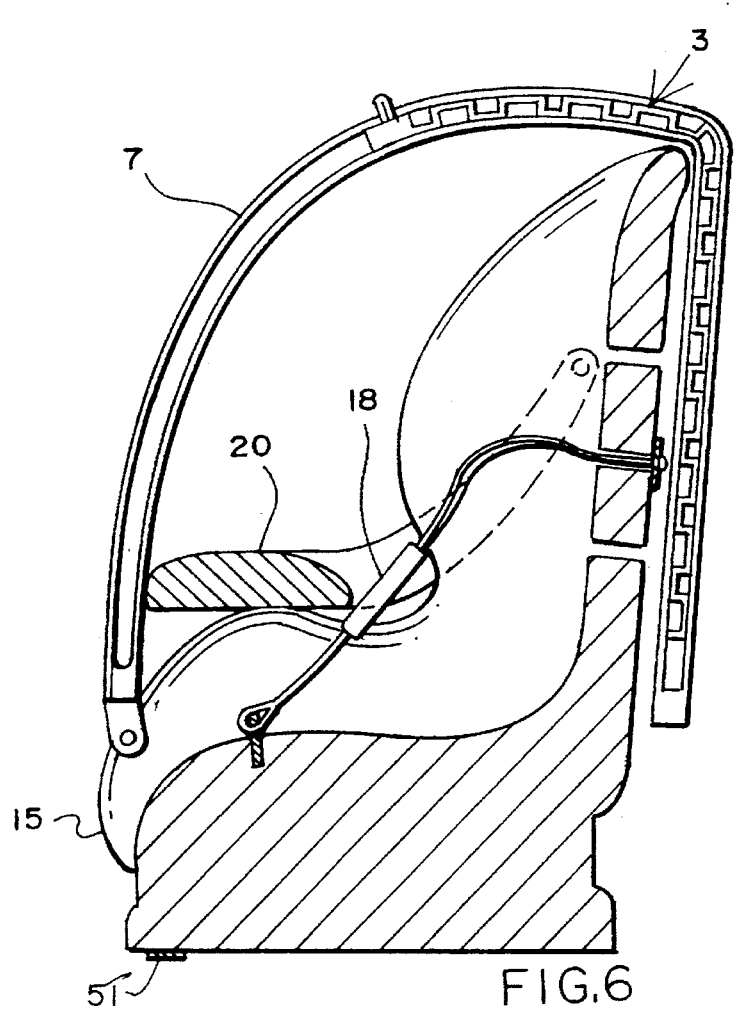

FIG. 5 a perspective view of the roll top shield from the back;

FIG. 6 is a broken side view of the child seat showing how the shield is secured to the seat and to the occupant thereof;

FIG. 7 is a perspective view showing the shield with optional vented side portions which can protect the child from flying debris that may come enter from a side angle;

FIG. 8 is an enlarged broken section view of the shield in FIG. 7 showing how the side shields connect to the parallel tracks of the roll-top shield and also showing how the roll top shield fits into the tracks of the frame;

FIG. 9 is enlarged broken perspective view of the roll top and its locking mechanism;

FIG. 10 is a broken perspective view of the roll top in its curved position;

FIG. 11 is a broken, cross-sectional view of the roll top member showing its one-piece molded design;

FIG. 12 is a broken section view of the roll top member showing how flexibility is achieved;

FIG. 13 is a side view of child seat with an integrated roll top safety shield and frame, with said frame having fastener receptacles for receiving and securing removable side panels (not shown); and FIG. 14 is a perspective view of the integrated child seat in FIG. 13 with the removable side panels securely in place.

DESCRIPTION OF A PREFERRED EMBODIMENT

The typical child seat 15 has a harness assembly 16 to secure the child therein. The harness assembly 16 typically has a pair of shoulder straps 17, a midsection pad 18, and a child securement strap 19 which fits into a securement slot 21 for removably securing the child. The child seat 15, as shown in FIG. 2, also includes a "padded shield" 20 for providing additional protection for a child, but not all child seats have such shields 20. For purposes of the present invention, it is irrelevant whether the child seat 15 has a shield 20 because a shield is not necessary to practice the present invention.

As noted in the description of the drawings, FIG. 1 shows the roll top shield kit 1. The present invention can come as a kit 1 to be installed on an existing child seat 15, as shown in FIG. 2, or it may be integrated into a child seat during the manufacturing process, as shown in FIGS. 13 and 14. The present invention, whether in kit form 1 or integrated into a child seat, has a roll top frame 5 with a back 6, and a bulbous front 7. The bulbous front 7 is comprised essentially of a pair of parallel tracks 9 that are capable of receiving the roll top 3. The parallel tracks 9 terminate into a pair of hollow portions 10. The back 6 and the parallel tracks 9 each have means for securing the frame 5 to the child seat 15.

As illustrated in FIG. 5, the securement means for the parallel tracks 9 is comprised of a two items that work in together. The first is a pair of curved base supports 50 that are contoured to sit snugly about the sides of the child seat 15. The second is a pair of base straps 51 that are secured each to the other around the base of the child seat 15, as shown in FIG. 2. One of the straps 51 may have loop fastening material on its exterior while the other may have hook fastening material to matingly engage the hoop fastening material of the other strap 51 and thereby removably secure each strap 51 to the other. By tightening and securing the straps 51 to each other, downward forces are imposed on the pair of cured base supports 50 and thereby removably securing the frame 5 to the seat 15. The curved base supports 50 are designed to fit interiorly of the hollow portions 10 of the parallel tracks 9 and are designed to receive a removable fastener for removably securing said base supports 50 to said tracks 9. A base fastener 52 fits through the base fastener slots 53 of the base straps 51 and then through the fastener receptacle 35 on the hollow portion 10 of the tracks to removably secure the base straps 51 and the curved base supports 50 to the frame 5.

Additionally, the back 6 has a back strap 12 that works in conjunction with the shoulder straps 17 for securing the roll top frame 5 to the child seat 15. The back strap 13 has two back strap slots 14 through which the shoulder straps 17 pass before being connected to the automobile's permanent restraint system. The back straps 12 are intended to work with the restraint systems of the typical child seat, and do not interfere with the proper installation of the typical child seat.

The bulbous front 7 is shaped to help prevent head injuries to the child 22 seated in the child seat 15. During a collision, the body of the child 22, if properly secured in the harness assembly 16, will remain substantially unmoved, but the child's head will continue to move forward. The shape of the bulbous front 7 allows for the head of the child 22 to travel forward without hitting the shield, thereby avoiding head injuries that would result were the shield not so shaped.

The roll-top frame 5 is formed with a pair of parallel tracks 9 for receiving the roll-top 3, and also contains a series of fastener receptacles 35 which allow for the attachment of optional side panels 30, as will be discussed below. FIG. 8 illustrates how the roll top 3 is seated in the tracks 9. The tracks 9 allow the roll-top 3 to be lowered and raised depending on the desired position. The roll top 3 is connected to a contoured bottom 8 whose shape allows it to better accommodate the legs and feet of a child that may extend beyond the roll top 3. By lowering the roll top 3 adjacent the hollow ends 10 of the tracks 9, the roll-top 3 can be locked in place with the roll top lock 25. The roll top 3 contains a roll-top lock that can be engaged to secure the roll top in a "closed position," which position provides protection against air bags and other flying debris. Alternatively, the roll top can be raised to an "open position" to allow the quick and easy placement or removal of the child 22 therein.

The "open position" is that position wherein the roll top 3 is fully retracted into the back 6 of the frame 5.

When the roll top is in its "open position," the roll top is stored behind the back cover 40, whose presence prevents the roll-top 3 from rubbing against the back seat of the automobile whereon the car seat 15 is installed. The back cover fasteners 43 secure the back cover 40 to the back 6 of the roll top frame 5. Said fasteners 43 pass through the back fastener slots 41 of the back cover 40 and are secured in the back fastener receptacles in the back 6.

The roll-top 3 is formed of a semi-rigid, clear plastic that is capable of flexing without breaking. The roll-top 3 may be a single piece construction to save cost. As shown in FIG. 11, a cross sectional view of the roll-top 3 resembles a square wave signal due to the series of hollow battens 26 formed therein. Between the battens 26 can be found a flat spacer 27 which can be readily flexed to allow the roll-top 3 to be easily moved from its open position to its closed position, and vice versa. The flexibility of the roll-top 3 is illustrated in FIGS. 10 and 12. At the ends of each of the battens 26 are roll top air vents 28 to allow circulation of air within the child seat.

When the roll-top 3 is in its "closed position," it acts as a shield to help protect the child 22 from an inflating airbag, as well as flying debris. The shield, however, may not protect against all debris. Thus, optional side panels 30 may be installed to provide protection against flying debris entering from the sides. Each of the side panels 30 has a front edge 32 that can be aligned in parallel fashion with the contoured shape of the bulbous front 7. The front edge 32 has a series of fastener slots 33 which can be aligned with the fastener receptacles 35 located along on the roll top frame 5. FIGS. 7 & 8 illustrates how a series of push-in fasteners 34 can be used to secure the side panels 30 to the roll top frame 5 by inserting the fasteners 34 through the fastener slots 33 of the side panels 30 and into the fastener receptacles 35 of the roll to frame 5. The side panels 30 may be made of clear, hard plastic, but should contain air vents 31 to allow circulation of the air in the child seat 15. In addition, the side panels 30 are contoured outwardly to allow installation on child seats with padded shields 20, like the one illustrated in FIG. 4.

It will be understood that various changes in the details, materials and arrangements of parts, which have been herein described and illustrated to explain the nature of the invention, may be made by those skilled in the art within the principle and scope of the invention as expressed in the appended claims.

What is claimed is:

1. A child seat for a child, to be used with a car seat in a vehicle, comprising, in combination:

a rigid frame adapted to be positioned on and removably secured to the car seat, said frame having a vertical back supporting member and a horizontal bottom supporting member to support the back and legs of the child, respectively, said back and bottom supporting members being covered with padding for comfort, a harness assembly for securing the child to the child seat;

a roll top frame comprising, a back frame, a bulbous front frame, and a top, said roll top frame having a pair of parallel tracks, and said bulbous front frame extending away from the top and then downward to the horizontal bottom supporting member of the child seat;

a roll top shield that slides along the two parallel tracks, said roll top shield being capable of being locked in at least two positions, one being a closed position wherein the shield provides maximum coverage for one child, and the other being an open position wherein the shield provides maximum access for placing and removing the child in the child seat; and a locking means for securing the roll top shield in the closed and open positions;

whereby the roll top shield can be locked into the closed position and therein provide coverage for the child.

2. The child seat of claim 1, wherein the bulbous front frame is shaped to allow forward movement of the child's head during a collision without contact between the child's head and the roll top shield.

3. The child seat of claim 1, wherein the roll top shield is a single piece construction containing a series of raised battens separated by flat spacers, said spacers allowing the shield to be flexed and thereby allowing movement along the tracks.

4. The child seat of claim 1, wherein the roll top shield contains a plurality of air vents to allow for circulation of air within the child seat.

5. The child seat of claim 1, further comprising a contoured bottom permanently secured to the roll top shield, said contoured bottom being shaped to accommodate the legs and feet of the child seated in the child seat.

6. The child seat of claim 1, further comprising:

two side panels with edges shaped to conform and be attached to the child seat along its bulbous front frame, its top and back frame; and removable securable means for removably securing the two side panels to the child seat;

whereby the side panels can be removably secured to the child seat and provide coverage for the child against flying debris that may strike the child from side angles.

7. The child seat of claim 6, wherein the removable securable means comprises, in combination, a plurality of fastener slots located along the edges of the side panels;

a plurality of fastener receptacles located along the bulbous front frame and the back frame; and a plurality of fasteners, whereby the fasteners can be used to removably secure the side panels to the child seat by passing the fasteners through the fastener slots of the side panels and into the fastener receptacles of the roll top frame.

8. The child seat of claim 6, wherein the side panels have a plurality of air vents to allow for air circulation within the child seat.

9. The child seat of claim 7 wherein the fasteners allow for easy and quick removal of the side panels to allow easy cleaning of said side panels.

10. A child seat for a child, to be used with a car seat in a vehicle, comprising, in combination:

a rigid frame adapted to be positioned on and removably secured to the car seat, said frame having a vertical back supporting member and a horizontal bottom supporting member to support the back and legs of the child, respectively, said back and bottom supporting members being covered with padding for comfort;

removably securable means for securing the rigid frame to the car seat;

a harness assembly for securing the child to the child seat;

a roll top frame having a pair of parallel tracks; and a roll top shield that slides along the two parallel tracks between two extreme positions, one being an open position to provide maximum access for placing and removing the child, and the other being a closed position to provide maximum coverage for the child, whereby said roll top shield may be slidably adjusted along the two parallel tracks between the open and closed positions.

11. The child seat of claim 10, wherein the roll top frame is shaped to allow forward movement of the child's head during a collision without contact between the child's head and the roll top shield.

12. A child seat for a child to be used with a car seat in a vehicle, comprising, in combination:

a rigid frame adapted to be positioned on and removably secured to the car seat, said frame having a vertical back supporting member and a horizontal bottom supporting member to support the back and legs of the child, respectively, said back and bottom supporting members being covered with padding for comfort;

said rigid frame also having two lateral, parallel side panels with a front, top and back edge, each of said panels having a track that runs along the front, top and back edges, said tracks running in opposed and parallel relationship to each other;

a harness assembly for securing the child to the child seat;

a roll top shield that slides along the two parallel tracks, said roll top shield being capable of being locked in at least two positions, one being a closed position wherein the shield provides maximum coverage for the child, and the other being an open position wherein the shield provides maximum access for placing and removing the child in the child seat;

said side panels being shaped to allow forward movement of the child's head during a collision without contact between the child's head and the roll top shield; and a locking means for securing the roll top shield in the closed and open positions;

whereby the roll top shield can be locked into the closed position and therein provide coverage for the child.

13. The child seat of claim 12, wherein the roll top shield is a single piece construction containing a series of raised battens separated by flat spacers, said spacers allowing the shield to be flexed and thereby allowing movement along the tracks.

14. The child seat of claim 12, wherein the side panels have a plurality of air vents to allow for air circulation within the child seat.

15. The child seat of claim 12, wherein the roll top shield contains a plurality of air vents to allow for circulation of air within the child seat.

16. The child seat of claim 12, further comprising a contoured bottom permanently secured to the roll top shield, said contoured bottom being shaped to accommodate the legs and feet of the child seated in the child seat.

17. A child seat for a child, to be used with a car seat in a vehicle, comprising, in combination:

a rigid frame adapted to be positioned on and removably secured to the car seat, said frame having a vertical back supporting member and a horizontal bottom supporting member to support the back and legs of the child, respectively, said back and bottom supporting members being covered with padding for comfort;

said rigid frame also having two lateral, parallel side panels with a front, top and back edge, each of said panels having a track that runs along the front, top and back edges, said tracks running in opposed and parallel relationship to each other;

removably securable means for securing the rigid frame to the car seat;

a harness assembly for securing the child to the child seat; and a roll top shield that slides along the two parallel tracks between two extreme positions, one being an open position to provide maximum access for placing and removing the child, and the other being a closed position to provide maximum coverage for the child, whereby said roll top shield may be slidably adjusted along the two parallel tracks between the open and closed positions.

18. The child seat of claim 17, wherein the lateral, parallel side panels are shaped to allow forward movement of the child's head during a collision without contact between the child's head and the roll top shield.

19. A supplemental safety shield assembly for a child seat for a child to be used with a car seat in a vehicle, said child seat having a rigid frame adapted to be positioned on and removably secured to the car seat, said frame having a vertical back supporting member and a horizontal bottom supporting member to support the back and legs of the child, respectively, said back and bottom supporting members being covered with padding for comfort, said bottom supporting member having a pair of lateral, raised sides, said child seat also having a securement slot and a harness assembly for removably securing the child to the child seat comprising two shoulder straps, a midsection pad and a child securement strap which fits into said securement slot for removably securing the child to said child seat, said supplemental safety shield assembly comprising, in combination:

a roll top frame comprising, a back frame, a bulbous front frame, and a top, said roll top frame having a pair of parallel tracks, and said bulbous front frame extending away from the top and then downward to the horizontal bottom supporting member of the child seat;

a roll top shield that slides along the two parallel tracks, said roll top shield being capable of being locked in at least two positions, one being a closed position wherein the shield provides maximum coverage for the child, and the other being an open position wherein the shield provides maximum access for placing and removing the child in the child seat;

a locking means for securing the roll top shield in the closed and open positions;

said back frame of the roll top frame having means for securing the supplemental safety shield assembly to the back supporting member of the child seat; and said bulbous front frame having means for securing the supplemental safety shield assembly to the bottom supporting member of the child seat;

whereby the supplemental safety shield assembly can be removably secured to the child seat and the roll top shield can be locked into the safety position and therein provide coverage for the child.

20. The supplemental safety shield assembly of claim 19, wherein the bulbous front frame is shaped to allow forward movement of the child's head during a collision without contact between the child's head and the roll top shield.

21. The supplemental safety shield assembly of claim 19, wherein the roll top shield is a single piece construction containing a series of raised battens separated by flat spacers, said spacers allowing the shield to be flexed and thereby allowing movement along the tracks.

22. The supplemental safety shield assembly of claim 19, wherein the roll top shield contains a plurality of air vents to allow for circulation of air within the child seat.

23. The supplemental safety shield assembly of claim 19, wherein the bulbous front frame's means for securing the supplementary safety shield assembly to the bottom supporting member of the child seat comprises:

a pair of curved base supports that are contoured to fit snugly about the lateral sides of the bottom supporting member of the child seat;

said curved based supports being designed to fit into and be secured to the bulbous front frame;

two base straps which can be secured each to the other about the horizontal bottom supporting member and the rigid frame of the child seat;

each of said base straps being designed to be secured to the bulbous front frame;

means for securing one base strap to the other base strap;

means for securing the base straps and the curved base supports to the bulbous front frame;

whereby once the base straps and the curved base supports are secured to the bulbous front frame and once the base straps are secured to each other about the horizontal bottom supporting member and the rigid frame of the child seat, the straps impose downward forces on the pair of curved base supports and thereby removably secure the roll top frame to the child seat.

24. The supplemental safety shield assembly of claim 23, wherein means for securing one base strap to the other base strap comprises:

a strip of loop fastening material that is permanently secured to one of the base straps;

a strip of hook fastening material that is permanently secured to the other of the base straps;

whereby the hook fastening material can be matingly engaged with the loop fastening material, thereby removably securing one base strap to the other base strap.

25. The supplemental safety shield assembly of claim 23, wherein means for securing the base straps and the curved base supports to the bulbous front frame is comprised of a removable fastener.

26. The supplemental safety assembly of claim 19, further comprising:

two side panels with edges shaped to conform and be attached to said child seat along its bulbous front frame, its top and its back frame; and removable securable means for removably securing the two side panels to the child seat;

whereby the side panels can be removably secured to the child seat and provide coverage for the child against flying debris that may strike the child from side angles.

27. The supplemental safety shield assembly of claim 26, wherein the removable securable means comprises, the side panels having a plurality of fastener slots along the edges of the side panels;

the roll top frame having a plurality of fastener receptacles along the bulbous front frame and the back frame; and a plurality of fasteners, whereby the fasteners can be used to removably secure the side panels to the child seat by passing the fasteners through the fastener slots of the side panels and into the fastener receptacles of the roll top frame.

28. The supplemental safety shield assembly of claim 27 wherein the fasteners allow for easy and quick removal of the side panels for easy cleaning.

29. The supplemental safety shield assembly of claim 26, wherein the side panels have a plurality of air vents to allow for air circulation within the child seat.

30. A supplemental safety shield assembly for a child seat for a child to be used with a car seat in a vehicle, said child seat having a rigid frame adapted to be positioned on and removably secured to the car seat, said frame having a vertical back supporting member and a horizontal bottom supporting member to support the back and legs of the child, respectively, said back and bottom supporting members being covered with padding for comfort, said child seat also having a harness assembly for removably securing the child to the child seat, said supplemental safety shield assembly comprising, in combination:

a roll top frame having a pair of parallel tracks that extend substantially the entire length of the roll top frame;

a roll top shield that slides along the two parallel tracks between two extreme positions, one being an open position to provide maximum access for placing and removing the child, and the other being a closed position to provide maximum coverage for the child; and removably securable means for removably securing the supplemental safety shield assembly to the child seat;

whereby the supplemental safety shield assembly can be removably secured to the child seat and the roll top shield may be slidably adjusted along the two parallel tracks between the open and closed positions.

31. The supplemental safety shield assembly of claim 30, wherein the roll top frame is shaped to allow forward movement of the child's head during a collision without contact between the child's head and the roll top shield.

32. The method of shielding a child against flying debris and inflating airbags through the use of a child seat having a rigid frame adapted to be positioned on and removably secured to a car seat, said frame having a vertical back supporting member and a horizontal bottom supporting member to support the back and legs of the child, respectively, said back and bottom supporting members being covered with padding for comfort, said rigid frame also having two lateral, parallel side panels with a front, top and back edge, each of said panels having a track that runs along the front, top and back edges, said tracks running in opposed and parallel relationship to each other, said child seat also having a harness assembly for securing the child to the child seat, and a roll top shield that slides along the two parallel tracks between two extreme positions, one being an open position to provide maximum access for placing and removing the child, and the other being a closed position to provide maximum coverage for the child, said method comprising the steps of:

securing the child seat to the car seat;

slidably adjusting the roll top shield to the open position;

placing the child in the child seat;

securing the child to the child seat with the harness assembly; and slidably adjusting the roll top shield along the parallel tracks to the closed position to provide coverage for the child against flying debris and inflating airbags.

33. The method of shielding a child against flying debris and inflating airbags through the use of a supplemental safety shield assembly and a child seat having a rigid frame adapted to be positioned on and removably secured to a car seat, said frame having a vertical back supporting member and a horizontal bottom supporting member to support the back and legs of the child, respectively, said back and bottom supporting members being covered with padding for comfort, said bottom supporting member having a pair of lateral, raised sides, said child seat also having a securement slot and a harness assembly for removably securing the child to the child seat, said supplemental safety shield assembly comprising, in combination, a roll top frame and a roll top shield, said roll top frame comprising a back frame and a front frame, and said roll top frame having a pair of parallel tracks, said roll top shield being slidable along the two parallel tracks, said roll top shield being capable of being locked in at least two positions, one being a closed position wherein the shield provides maximum coverage for the child, and the other being an open position wherein the shield provides maximum access for placing and removing the child in the child seat, said roll top frame having means for securing the supplemental safety shield assembly to the back supporting member of the child seat, and said front frame having means for securing the supplemental safety shield assembly to the bottom supporting member of the child seat, said method comprising the steps of:

securing the child seat to the car seat;

securing the supplemental safety shield assembly to the child seat;

slidably adjusting the roll top shield to the open position;

placing the child in the child seat;

securing the child to the child seat with the harness assembly; and slidably adjusting the roll top shield along the parallel tracks to the closed position to provide coverage for the child against flying debris and inflating airbags.

* * * * *